US006696517B2

United States Patent
Löffler et al.

(10) Patent No.: US 6,696,517 B2
(45) Date of Patent: Feb. 24, 2004

(54) USE OF COPOLYMERS BASED ON ACRYLAMIDOALKYLSULFONIC ACIDS AS THICKENERS IN PREPARATIONS COMPRISING ORGANIC SOLVENTS

(75) Inventors: Matthias Löffler, Niedernhausen (DE); Roman Morschhäuser, Mainz (DE); Peter Klug, Grossostheim (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 10/123,450

(22) Filed: Apr. 16, 2002

(65) Prior Publication Data

US 2003/0004241 A1 Jan. 2, 2003

(30) Foreign Application Priority Data

Apr. 20, 2001 (DE) .......................................... 101 19 338

(51) Int. Cl.$^7$ .............................................. C08F 120/52
(52) U.S. Cl. ...................... 524/555; 524/548; 524/543; 524/552; 524/700; 524/726; 524/808; 524/812
(58) Field of Search ................................ 524/555, 548, 524/543, 552, 700, 726, 808, 812, 817

(56) References Cited

U.S. PATENT DOCUMENTS

| 6,030,928 | A | * | 2/2000 | Stahl et al. .................. 507/121 |
| 6,231,876 | B1 | * | 5/2001 | Niessner et al. ............ 424/401 |
| 6,355,752 | B1 | | 3/2002 | Brungs et al. |
| 6,380,137 | B1 | | 4/2002 | Heier et al. .................. 507/121 |

FOREIGN PATENT DOCUMENTS

EP 1 033 378 9/2000

OTHER PUBLICATIONS

U.S. Ser. No. 09/760,317, filed Jan. 11, 2001, Loffler, et al.
U.S. Ser. No. 10/027,043, filed Dec. 20, 2001, Brungs, et al.

* cited by examiner

Primary Examiner—David W. Wu
Assistant Examiner—Satya B Sastri

(74) Attorney, Agent, or Firm—Richard P. Silverman; Scott E. Hanf

(57) ABSTRACT

The invention relates to the use of copolymers consisting essentially of a1) 1 to 50% by weight of the repeat structural unit of the formula (1):

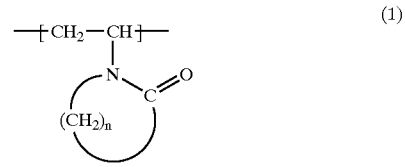

where n is an integer from 2 to 9 or a2) 1 to 50% by weight of a mixture of the repeat structural unit of the formula (1) and of the repeat structural unit of the formula (2):

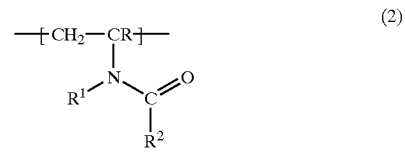

where R, $R^1$ and $R^2$ may be identical or different and are hydrogen or a linear or branched alkyl or alkenyl group having in each case 1 to 30 carbon atoms, and b) 49.99 to 98.99% by weight of the repeat structural unit of the formula (3):

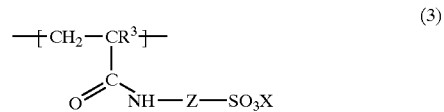

in which $R^3$ is hydrogen, methyl or ethyl, Z is ($C_1$–$C_8$)-alkylene and X is an ammonium, alkali metal or alkaline earth metal ion and c) 0.01 to 8% by weight of crosslinking structures which originate from monomers having at least two olefinic double bonds, as thickeners in preparations comprising organic solvents.

17 Claims, No Drawings

USE OF COPOLYMERS BASED ON ACRYLAMIDOALKYLSULFONIC ACIDS AS THICKENERS IN PREPARATIONS COMPRISING ORGANIC SOLVENTS

The present invention relates to the use of water-soluble or water-swellable copolymers based on acrylamidoalkylsulfonic acids and cyclic N-vinylcarboxamides or cyclic and linear N-vinylcarboxamides as thickeners in preparations comprising organic solvents.

Water-containing or solvent-containing multicomponent systems, such as solutions, emulsions or suspensions, are frequently adjusted to higher viscosities or thickened because of economic or application reasons or because of the stability. Thus it is possible, for example, by increasing the viscosity of the external or internal phase of the emulsions or suspensions, to significantly prolong the time before the components separate, which signifies increased storage time. In the case of many products, increasing the viscosity also improves their uniform distribution, in particular on uneven surfaces. This is true in particular for hair care compositions, skin care compositions and pharmaceutical ointments on the skin. In the case of many technical products, such as, for example, wallpaper strippers, paint removers or aircraft deicers, the increased viscosity prevents the product from prematurely running off the surface to be treated. The more uniform distribution and prolonged contact time increases the effectiveness. In addition to the application advantages mentioned, the high viscosity of such preparations also offers advantages for the preparation, packaging, bottling and storage, and also for transportation. In particular, the thickening of acidic media is of importance here from a safety viewpoint.

In general, the rheological properties during the preparation or formulation of cosmetic, pharmaceutical or technical preparations are a decisive criterion for the use of these products in practice. The thickeners used should lead, even in the smallest possible amounts and in a wide pH range, to adequate thickening. The principal properties of the products, e.g. including their color, should not be changed.

Numerous thickener systems have been proposed in the specialist literature for setting rheological properties of aqueous or solvent-containing systems.

Known thickeners are, for example, polymers based on polyacrylic acid, e.g. ®Carbopols, carbomers, ammonium polyacrylates or sodium acrylates copolymers. Also suitable are cellulose ethers, cellulose derivatives (e.g. carboxymethylcellulose, hydroxyethylcellulose), gelatins, starch and starch derivatives, sodium alginates, fatty acid polyethylene glycol esters, agar agar, tragacanth or dextrins. Also suitable are polyvinyl alcohols, polyacrylamides, polyvinylpyrrolidone, polyvinyl methyl ether, polyethylene oxides, copolymers of maleic anhydride and vinyl methyl ether, and mixtures thereof.

Use is also made of long-chain polyethers together with fatty acid esters, e.g. polyethylene glycol 6000 distearate, polyethylene glycol-polypropylene glycol monoethers, and reaction products of polyalcohols with fatty acids, e.g. pentaerythritol fatty acid esters.

However, the thickeners mentioned in the prior art are not free from disadvantages.

Thus, for example, the thickeners based on polyacrylic acid have only inadequate thickening ability in the strongly acidic pH range and in the case of compositions with a high content of organic solvents. In addition, the corresponding gels/formulation are sensitive to UV radiation and shearing and in addition impart a sticky feel to the skin.

Cellulose derivatives are very susceptible to bacteria. The formation of "thread-drawing" gels is also undesired.

Fatty acid polyethylene glycol esters tend toward hydrolysis in the presence of water. The insoluble fatty acids formed therein cause undesired clouding.

Thickeners of a natural origin (e.g. agar agar or tragacanth) have a greatly varying composition depending on their origin.

Surprisingly, it has now been found that copolymers based on acrylamidoalkylsulfonic acids and cyclic N-vinylcarboxamides or cyclic and linear N-vinylcarboxamides are highly suitable as thickeners for preparations comprising organic solvents.

The invention therefore provides for the use of copolymers consisting essentially of a1) 1 to 50% by weight of the repeat structural unit of the formula (1):

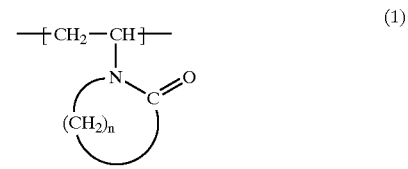

where n is an integer from 2 to 9 or a2) 1 to 50% by weight of a mixture of the repeat structural unit of the formula (1) and of the repeat structural unit of the formula (2):

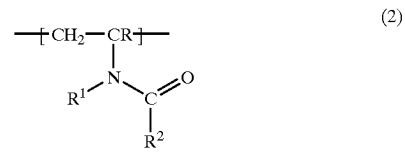

where R, $R^1$ and $R^2$ may be identical or different and are hydrogen or a linear or branched alkyl or alkenyl group having in each case 1 to 30 carbon atoms, preferably 1 to 20 carbon atoms, particularly preferably 1 to 12 carbon atoms, and b) 49.99 to 98.99% by weight of the repeat structural unit of the formula (3):

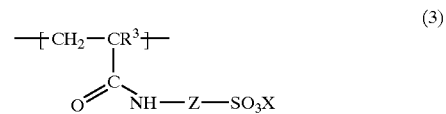

in which $R^3$ is hydrogen, methyl or ethyl, Z is $(C_1-C_8)$-alkylene and X is an ammonium, alkali metal or alkaline earth metal ion and c) 0.01 to 8% by weight of crosslinking structures which originate from monomers having at least two olefinic double bonds, as thickeners in preparations comprising organic solvents.

The mixing ratio with regard to structural unit a2) can vary within any desired limits.

Preferred copolymers comprise 2 to 30% by weight, particularly preferably 3 to 15% by weight, of the structural units a1) or a2), preferably of the structural unit a2), 69.5 to 97.5% by weight, particularly preferably 84.5 to 96.5% by weight, of the structural unit b) and 0.01 to 5% by weight, particularly preferably 0.2 to 3% by weight, particularly preferably 0.5 to 2% by weight, of the structural unit c).

Particularly preferred structural units according to formula (1) are derived from N-vinylpyrrolidone.

Suitable structural units according to formula (3) are preferably 2-acrylamido-2-methylpropanesulfonic acid, preferably the ammonium salts, particularly preferably the $NH_4^+$ salt.

The crosslinking structural units c) are preferably derived from allyl acrylate or allyl methacrylate, trimethylolpropane triacrylate, trimethylolpropane trimethacrylate, dipropylene glycol diallyl ether, polyglycol diallyl ether, triethylene glycol divinyl ether, hydroquinone diallyl ether, tetraallyloxyethane or other allyl or vinyl ethers of multifunctional alcohols, tetraethylene glycol diacrylate, triallylamine, trimethylolpropane diallyl ether, methylenebisacrylamide and/or divinylbenzene. Particular preference is given to allyl acrylate, allyl methacrylate, trimethylolpropane triacrylate and/or trimethylolpropane trimethacrylate.

In particular, the crosslinking structures are derived from monomers of the formula (4):

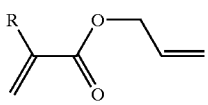

in which R is hydrogen, methyl or ethyl.

The copolymers are preferably water-soluble or water-swellable copolymers.

The copolymers are preferably prepared by free-radical copolymerization, preferably by precipitation polymerization, particularly preferably in tert-butanol. In this connection, the monomers corresponding to the formulae (1), (2) and (3) are preferably dissolved or dispersed in a protic solvent, then one or more crosslinkers c) are added to this solution or dispersion and the polymerization is started in a known manner by adding a free-radical-forming compound.

The polymerization reaction is preferably carried out in a water-soluble alcohol or a mixture of two or more alcohols having 1 to 6 carbon atoms, preferably in tert-butanol. The water content of the alcohol or alcohol mixture should not exceed 10% by weight since otherwise formation of clumps may arise over the course of the polymerization. The nature and the amount of solvent should be chosen in such a way that the salt of acrylamidoalkylsulfonic acid corresponding to formula (3), in particular 2-acrylamido-2-methylpropanesulfonic acid, is largely soluble or dispersible therein. Largely soluble or dispersible is to be understood as meaning that no solid material settles out of the solution or dispersion even after the stirrer has been switched off. The polymer produced in the course of the reaction should, on the other hand, be largely insoluble in the chosen solvent or solvent mixture. Largely insoluble is to be understood here as meaning that a readily stirrable, pulpy polymer paste in which no clumps or agglutinations form arises during the course of the polymerization. The filtrate obtainable by filtering the paste with suction should have a solids content of at most 5% by weight. If the copolymers are soluble to a greater extent in the chosen solvent or solvent mixture, then clumping may arise upon drying the polymer paste.

The polymerization reaction itself is started in a manner known per se by free-radical-forming compounds such as azoinitiators (e.g. azobisisobutyronitrile), peroxides (e.g. dilauryl peroxide) or persulfates in the temperature range from 20 to 120° C., preferably between 40 and 80° C., and continues over a period of some 30 minutes to a few hours.

The property profile of the copolymers can be varied by varying the mixing ratio of the monomers and also the proportion of crosslinker. Thus, for example, the increased incorporation of ammonium salts of the acrylamidosulfonic acids can improve the thickening action of the polymers. On the other hand, the incorporation of more cyclic N-vinylcarboxamide improves the electrolyte compatibility of the polymers and their solubility in nonaqueous systems.

Particularly preferred copolymerized acrylamidopropylsulfonic acid salts are the $NH_4^+$ salts. Instead of the ammonium salts, it is also possible to use the free acrylamidopropylsulfonic acids and to produce the ammonium salts by introducing ammonia prior to the addition of the remaining monomers.

The preparations preferably comprise 0.1 to 5% by weight, particularly preferably 0.5 to 2% by weight, especially preferably 0.7 to 1.5% by weight, of copolymers.

The organic solvents are preferably polar-aprotic solvents, particularly preferably water-miscible polar-aprotic solvents.

Preference is given to monohydric alcohols, particularly preferably those chosen from methanol, ethanol, propanol, isopropanol, n-butanol, isobutanol, t-butanol, benzyl alcohol, phenoxyisopropanol, phenylpropanol, diacetone alcohol, oleyl alcohol, ethoxyethanol, hexyl alcohol, isobutoxypropanol, 4-methoxybutanol, methoxyethanol, methoxyisopropanol, methoxymethylbutanol, trimethylhexanol, especially preferably those having 1 to 6 carbon atoms, very particularly preferably methanol, ethanol, propanol, isopropanol, n-butanol, isobutanol and t-butanol.

Preference is also given to polyhydric alcohols, particularly preferably those chosen from the group glycerol, benzene glycol, butoxy diglycol, butoxyethanol, butanediol, butoxyisopropanol, butylene glycol, butyloctanol, pentylene glycol, hexanediol, propylene glycol, diethylene glycol, dimethoxydiglycol, dipropylene glycol, glycol, 1,2,6-hexanetriol, isopentyldiol, methoxydiglycol, methylpropanediol, neopentyl glycol, ethoxydiglycol, ethylhexanediol, hexylene glycol, very particularly preferably glycerol, propylene glycol, butylene glycol and glycol.

Preference is also given to ketones, esters, ethers, amides, sulfoxides, nitriles, O—, N— and S-heterocycles, preferably acetone, methoxyethanol acetates, triacetin (glycerol triacetate), amyl acetate, benzyl benzoate, benzyl laurate, butoxyethyl acetate, butyl acetate, butylene glycol propionate, butyl lactate, butyloctyl benzoate, butyloctyl salicylate, butyrolactone, C5–18 fatty acid triglycerides, PEG/PPG copolymers, propyl acetate, propylene carbonate, propylene glycol butyl ether, propylene glycol propyl ether, tetrahydrofurfuryl acetate, tetrahydrofurfuryl alcohol, thiolanediol, tributyl citrate, tributylcresylbutane, acetonitrile, THF (tetrahydrofuran), DMF (dimethylformamide), DMSO (dimethylsulfoxide), DBU (diaazabicycloundecane), pyridine, particularly preferably acetone, acetonitrile, THF (tetrahydrofuran) and DMF (dimethylformamide).

Also preferred are ethoxylated and/or propoxylated alcohols, particularly preferably ethoxylated and/or propoxylated alcohols with 1 to 20 mol of ethylene oxide and/or 1 to 20 mol of propylene oxide, especially preferably ethoxylated and/or propoxylated alcohols chosen from polypropylene glycol-7, polypropylene glycol-10, PPG-2-buteth-3, PPG-3-buteth-5, PPG-5-buteth-7, PPG-7-buteth-10, PPG-12-buteth-16, PPG-15-buteth-20, PPG-20-buteth- 20, PPG-2-butyl ether, PPG-3-butyl ether, PPG-24-glycereth-24, PPG-10-glyceryl ether, glyceryl ether, PPG-2-methyl ether, PPG-3-methyl ether, PPG-2-methyl ether acetate, PPG-2-propyl ether, propylene glycol butyl ether, propylene glycol propyl ether, methoxy PEG-10, methoxy PEG-16, buteth-3, sorbeth-6 and sorbeth-20.

Preference is also given to polyethylene glycols, particular preference to polyethylene glycols with a molecular mass of less than 2 000 g/mol, particularly preferably polyethylene glycols with a molecular mass between 200 and 600 g/mol.

Mixtures of organic solvents may be advantageous depending on the application and are thus expressly within the meaning of the invention.

The solvent content of the preparations can be 5 to 99.9% by weight, based on the finished preparation.

Surprisingly, the copolymers exhibit very good thickening performance even in the range of high solvent contents. Preparations with high solvent contents preferably comprise 40 to 95% by weight, particularly preferably 50 to 85% by weight, of solvents.

Preparations with low contents of solvents preferably comprise 5 to 30% by weight of solvents. Preparations with low contents of solvents exhibit a high viscosity stability, particularly in the pH range 3 to 6, preferably 3 to 5.

The preparations may contain water or be free from water. However, particularly in the case of cosmetic, dermatological and pharmaceutical preparations, a water content of from 30 to 80% by weight, based on the finished preparations, is advantageous.

The preparations preferably have a pH in the range 3 to 10, particularly preferably 4 to 9.

The use of the copolymers as thickeners is particularly suitable for cosmetic, dermatological and pharmaceutical preparations.

The cosmetic compositions may be rinse-off products, e.g. shampoos, shower preparations, shower gels, foam baths, or else leave-on products, e.g. skincare compositions, such as day creams, night creams, care creams, nutrient creams, body lotions, ointments, sunscreens, lipcare compositions and deodorants. They may also be surfactant-free aqueous-solvent-containing compositions and emulsions, e.g. hair cures and rinses, hair gels, permanent waving compositions, hair colorants and the like.

The cosmetic, dermatological and pharmaceutical preparations according to the invention can comprise, as further auxiliaries and additives, all customary surfactants, oily substances, emulsifiers and coemulsifiers, superfatting agents, stabilizers, biogenic active ingredients, preservatives, pearlizing agents, dyes and fragrances, opacifiers, further thickeners and dispersants, protein derivatives, e.g. gelatin, collagen hydrolysates, natural- and synthetic-based polypeptides, egg yolk, lecithin, lanolin and lanolin derivatives, fatty alcohols, silicones, deodorizing compositions, substances with a keratolytic and keratoplastic action, enzymes, antimicrobial agents and carrier substances.

However, the use according to the invention is not limited to cosmetic, dermatological and pharmaceutical preparations. Rather, the preparations may, for example, also be paint removers, lacquer removers, aircraft deicers, hard surface cleaners, window cleaners, emulsion paints, printing inks and pastes.

An essential advantage of the use according to the invention is the high viscosity stability of the preparations toward pH changes. A further advantage is the high UV stability of the preparations.

The invention also provides a method of thickening preparations comprising organic solvents, which comprises adding to the preparations at least one copolymer consisting essentially of a1) 1 to 50% by weight of the repeat structural unit of the formula (1):

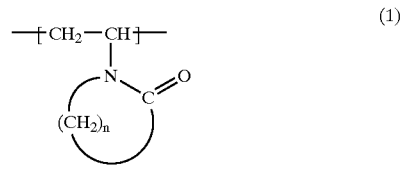

where n is an integer from 2 to 9 or a2) 1 to 50% by weight of a mixture of the repeat structural unit of the formula (1) and of the repeat structural unit of the formula (2):

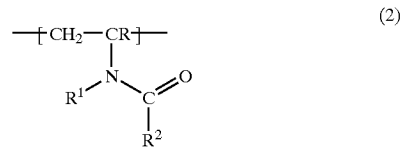

where R, $R^1$ and $R^2$ may be identical or different and are hydrogen or a linear or branched alkyl or alkenyl group having in each case 1 to 30, preferably 1 to 20, particularly 1 to 12 carbon atoms, and b) 49.99 to 98.99% by weight of the repeat structural unit of the formula (3):

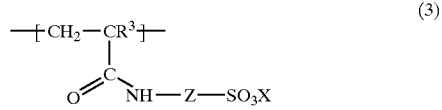

in which $R^3$ is hydrogen, methyl or ethyl, Z is $(C_1-C_8)$-alkylene and X is an ammonium, alkali metal or alkaline earth metal ion and c) 0.01 to 8% by weight of crosslinking structures which originate from monomers having at least two olefinic double bonds.

The examples below serve to illustrate the invention in more detail without, however, limiting it thereto.

1) Preparation of the copolymers:

Copolymer 1:

490.5 g of tert-butanol and 11.5 g of water were introduced into a 1 000 ml flask fitted with anchor stirrer, reflux condenser, internal thermometer, and feed option for $N_2$ and $NH_3$. 80.75 g of 2-acrylamido-2-methylpropanesulfonic acid were then introduced and dispersed with vigorous stirring, clouding of the solvent being retained. Over a period of 30 minutes, 6.64 g of ammonia was introduced into the gas head space, and the mixture was stirred for at least a further 30 minutes until the pH was 6–7. 4.10 g of N-vinylpyrrolidone and 0.8 g of allyl methacrylate were added, and the receiver was in each case then rinsed with tert-butanol (about 6 ml) in order to minimize losses during the addition. The reaction mixture was then heated to a temperature of T=60° C., the reaction mixture being rendered inert by the simultaneous introduction of $N_2$. After a temperature of T=60° C. had been reached, 1.0 g of dilauryl peroxide were added. The reaction started directly after the addition of the initiator, which was evident from an increase in the temperature and from flocculation of the polymer. Approximately 15 minutes after the polymerization reaction had started, the nitrogen feed was switched off. Approximately 30 minutes after the addition of the dilauryl peroxide the temperature reached a maximum (about 65–70° C.). For a further 30 minutes after this maximum had been passed through the mixture was refluxed and then stirred under these conditions for two hours. The contents of the reaction vessel adopted a pulp-like consistency over the course of the reaction, but was still readily stirrable. The mixture was then cooled to room temperature and the solid was filtered off with suction.

The paste was dried at 60–70° C. in a vacuum drying cabinet for 24 hours, giving 92.2 g of a fine white powder.

Copolymer 2:

The reaction was carried out analogously to example 1, except that instead of allyl methacrylate, 1.65 g of trimethylolpropane methacrylate were used.

Copolymer 3:

The reaction was carried out analogously to example 1, except that instead of allyl methacrylate, 1.65 g of trimethylolpropane trimethacrylate were used.

Copolymer 4:

The reaction was carried out analogously to example 1, but using 77.5 g of 2-acrylamido-2-methylpropanesulfonic acid, 8.9 g of N-vinylpyrrolidone, 4.2 g of N-vinylformamide and 1.8 g of trimethylolpropane triacrylate as monomers.

2) Applications:

Tables 1, 2 and 3 show the thickening performance of the copolymers in solvent-containing preparations. The comparison used was a commercially available thickener based on acrylic acid (Carbopol® 980 from Goodrich). To measure the viscosity, aqueous gels were prepared from copolymer 1 and Carbopol® 980, said gels then being adjusted to the desired solvent concentration by adding polar-aprotic solvents. The thickener content was always 1.0% by weight. The viscosity was measured at 20° C. using a Brookfield viscometer model RVT at 20 rpm.

TABLE 1

Viscosities (mPas) of 1.0% by weight of copolymer 1 and 1.0% by weight of ®Carbopol 980 in ethanol/demineralized water and acetone/demineralized water mixtures; pH 5.5 to 6

| Mixtures | Viscosities (mPas) Copolymer 1 | Viscosities (mPas) ®Carbopol 980 |
|---|---|---|
| EtOH/demin. water | | |
| 0:10 | 50000 | 61000 |
| 1:9 | 49000 | 59000 |
| 2:8 | 48000 | 48000 |
| 3:7 | 46000 | <100 |
| 4:6 | 41000 | <100 |
| 5:5 | 33000 | <100 |
| 6:4 | 23500 | <100 |
| 7:3 | 14000 | <100 |
| 8:2 | 5000 | <100 |
| Acetone/demin. water | | |
| 0:10 | 50000 | 61000 |
| 1:9 | 48300 | 65500 |
| 2:8 | 46400 | 66000 |
| 3:7 | 44000 | 50000 |

TABLE 1-continued

Viscosities (mPas) of 1.0% by weight of copolymer 1 and 1.0% by weight of ®Carbopol 980 in ethanol/demineralized water and acetone/demineralized water mixtures; pH 5.5 to 6

| Mixtures | Viscosities (mPas) Copolymer 1 | Viscosities (mPas) ®Carbopol 980 |
|---|---|---|
| 4:6 | 41000 | <100 |
| 5:5 | 36000 | <100 |
| 6:4 | 27000 | <100 |

TABLE 2

Viscosities (mPas) of 1.0% by weight of copolymer 1 and 1.0% by weight of ®Carbopol 980 in ethanol/demineralized water (1:9) at various pHs

| pH | Viscosities (mPas) Copolymer 1 | Viscosities (mPas) ®Carbopol 980 |
|---|---|---|
| 7.0 | 49000 | 59000 |
| 6.0 | 48000 | 48000 |
| 5.0 | 47000 | 25000 |
| 4.5 | 47500 | 10000 |
| 4.0 | 48000 | <100 |
| 3.5 | 35000 | <100 |
| 3.0 | 29000 | <100 |

TABLE 3

Viscosities (mPas) of 1.0% by weight of copolymer 1 in 1:1 mixtures of various solvents with water; pH 5.5 to 6

| Mixture | Viscosity (mPas) | Appearance |
|---|---|---|
| Propylene glycol/demin. water | 55000 | clear gels |
| PEG 400/demin. water | 18200 | clear gels |
| Glycol/demin. water | 46800 | clear gels |
| Glycerol/demin. water | 55000 | clear gels |
| Acetonitrile/demin. water | 23500 | cloudy gel |
| DMF/demin. water | 39500 | clear gel |
| DMSO/demin. water | 63500 | cloudy gel |

It can be seen that the copolymers have a high thickening performance in solvent-containing preparations. This applies in particular in the range of high solvent contents. In the range of lower solvent contents, the thickening performance is very good particularly in the acidic pH range.

What is claimed is:

1. A process for thickening a preparation comprising an organic solvent said process comprising adding to the preparation of at least one copolymer, consisting essentially of a1) 1 to 50% by weight of the repeat structural unit of the formula (1):

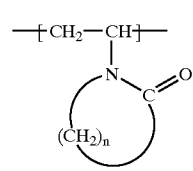

where n is an integer from 2 to 9 or a2) 1 to 50% by weight of a mixture of the repeat structural unit of the formula (1) and of the repeat structural unit of the formula (2):

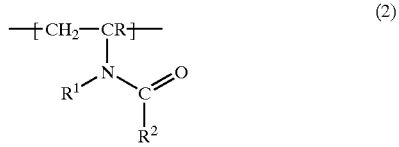

(2)

where R, $R^1$ and $R^2$ may be identical or different and are hydrogen or a linear or branched alkyl or alkenyl group having in each case 1 to 30 carbon atoms, and b) 49.99 to 98.99% by weight of the repeat structural unit of the formula (3):

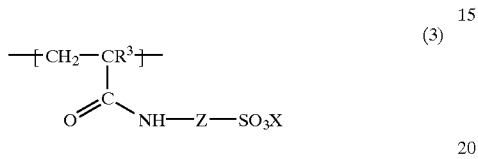

(3)

in which $R^3$ is hydrogen, methyl or ethyl, Z is $(C_1–C_8)$-alkylene and X is an ammonium, alkali metal or alkaline earth metal ion and c) 0.01 to 8% by weight of a crosslinking structure which originates from monomers having at least two olefinic double bonds, wherein the structural unit of c) is derived from the group consisting of allyl acrylate, allyl methacrylate, trimethylolpropane triacrylate, trimethylolpropane trimethacrylate, and mixtures thereof.

2. The process of claim 1, wherein the copolymers comprise 2 to 30% by weight of the structural units a1) or a2), 69.5 to 97.5% by weight of the structural unit b) and 0.01 to 5% by weight of the structural unit c).

3. The process of claim 1, wherein the copolymers comprise the structural unit a2).

4. The process of claim 1, wherein the structural unit according to formula (1) is derived from N-vinylpyrrolidone.

5. The process of claim 1, wherein the structural unit according to formula (3) is derived from 2-acrylamido-2-methylpropanesulfonic acid or an ammonium salt thereof.

6. The process of claim 1, wherein the copolymers are prepared by precipitation polymerization in tert-butanol.

7. The process of claim 1, wherein the preparation comprises 0.1 to 5% by weight of copolymers, based on a finished preparation.

8. A process for thickening a preparation comprising an organic solvent said process comprising adding to the preparation of at least one copolymer, consisting essentially of a1) 1 to 50% by weight of the repeat structural unit of the formula (1):

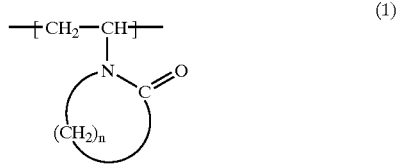

(1)

where n is an integer from 2 to 9 or a2) 1 to 50% by weight of a mixture of the repeat structural unit of the formula (1) and of the repeat structural unit of the formula (2):

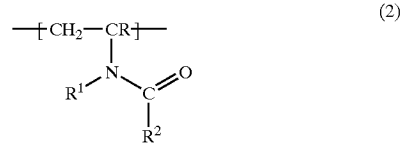

(2)

where R, $R^1$ and $R^2$ may be identical or different and are hydrogen or a linear or branched alkyl or alkenyl group having in each case 1 to 30 carbon atoms, and b) 49.99 to 98.99% by weight of the repeat structural unit of the formula (3):

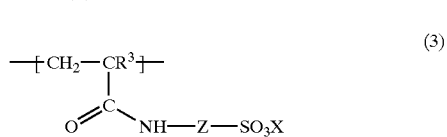

(3)

in which $R^3$ is hydrogen, methyl or ethyl, Z is $(C_1–C_8)$-alkylene and X is an ammonium, alkali metal or alkaline earth metal ion and c) 0.01 to 8% by weight of a crosslinking structure which originates from monomers having at least two olefinic double bonds and, wherein the organic solvent comprises a polar-aprotic solvent.

9. The process of claim 8, wherein the organic solvent is selected from the group consisting of monohydric alcohols, polyhydric alcohols, ketones, esters, ethers, amides, sulfoxides, nitriles, O—, N—and S-heterocycles, ethoxylated alcohols, propoxylated alcohols polyethylene glycols, and mixtures thereof.

10. The process of claim 9, wherein the organic solvent is selected from the group consisting of methanol, ethanol, propanol, isopropanol, n-butanol, isobutanol, t-butanol, glycerol, propylene glycol, butylene glycol, glycol, acetone, acetonitrile, tetrahydrofuran, dimethylformamide, and mixtures thereof.

11. The process of claim 8, wherein the preparation comprises 5 to 99.9% by weight of organic solvent, based on a finished preparation.

12. The process of claim 8, wherein the preparation comprises 40 to 95% by weight of the organic solvent based on a finished preparation.

13. The process of claim 8, wherein the preparation comprises 5 to 30% by weight of organic solvent, based on a finished preparation and the finished preparation has a pH ranging from 3 to 6.

14. The process of claim 8, wherein the preparation further comprises 30 to 80% by weight of water, based on the finished preparation.

15. The process of claim 8, wherein the preparation has a pH of from 4 to 9.

16. The process of claim 8, wherein the preparation is selected from the group consisting of cosmetic, dermatological, and pharmaceutical preparations.

17. A method of thickening preparations comprising organic solvents, which comprises adding to the preparations at least one copolymer consisting essentially of a1) 1 to 50% by weight of the repeat structural unit of the formula (1):

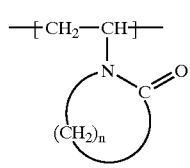

(1)

where n is an integer from 2 to 9 or a2) 1 to 50% by weight of a mixture of the repeat structural unit of the formula (1) and of the repeat structural unit of the formula (2):

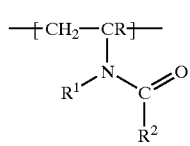

(2)

where R, $R^1$ and $R^2$ may be identical or different and are hydrogen or a linear or branched alkyl or alkenyl group having in each case 1 to 30 carbon atoms, and b) 49.99 to 98.99% by weight of the repeat structural unit of the formula (3):

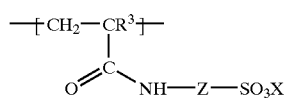

(3)

in which $R^3$ is hydrogen, methyl or ethyl, Z is $(C_1-C_8)$-alkylene and X is an ammonium, alkali metal or alkaline earth metal ion and c) 0.01 to 8% by weight of crosslinking structures which originate from monomers having at least two olefinic double bonds said crosslinking structures selected from the group consisting of allyl acrylate, allyl methacrylate, trimethylolpropane triacrylate, trimethylolpropane trimethacrylate, and mixtures thereof wherein the organic solvents comprise a water-miscible polar-aprotic solvent.

* * * * *